United States Patent
Kutsubo et al.

(10) Patent No.: US 9,243,703 B2
(45) Date of Patent: Jan. 26, 2016

(54) LUBRICATING OIL SUPPLY DEVICE

(71) Applicant: AISIN AW CO., LTD., Anjo-shi, Aichi-ken (JP)

(72) Inventors: Hiroyuki Kutsubo, Anjo (JP); Kazuki Kojima, Nukata (JP); Tetsuya Shimizu, Anjo (JP); Kenichi Tsuchida, Nishio (JP); Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 14 days.

(21) Appl. No.: 14/347,384

(22) PCT Filed: Dec. 20, 2012

(86) PCT No.: PCT/JP2012/083021
§ 371 (c)(1),
(2) Date: Mar. 26, 2014

(87) PCT Pub. No.: WO2013/099748
PCT Pub. Date: Jul. 4, 2013

(65) Prior Publication Data
US 2014/0251745 A1 Sep. 11, 2014

(30) Foreign Application Priority Data
Dec. 28, 2011 (JP) .................................. 2011-289671

(51) Int. Cl.
*F16H 41/30* (2006.01)
*F16H 61/00* (2006.01)
*F16H 61/02* (2006.01)
(Continued)

(52) U.S. Cl.
CPC ................ *F16H 41/30* (2013.01); *F16H 45/02* (2013.01); *F16H 57/0446* (2013.01); *F16H 61/0021* (2013.01); *F16H 61/0206* (2013.01); *F16N 25/00* (2013.01); *F16H 61/143* (2013.01);
(Continued)

(58) Field of Classification Search
None
See application file for complete search history.

(56) References Cited

U.S. PATENT DOCUMENTS 4,751,858 A 6/1988 Iwatsuki
6,199,441 B1 3/2001 Kanenobu et al.
(Continued)

FOREIGN PATENT DOCUMENTS

CN 102197245 A 9/2011
JP A-62-141362 6/1987
(Continued)

OTHER PUBLICATIONS

International Search Report issued in International Application No. PCT/JP2012/083021 dated Jan. 29, 2013.

*Primary Examiner* — Ramya Burgess
*Assistant Examiner* — Mark Manley
(74) *Attorney, Agent, or Firm* — Oliff PLC

(57) ABSTRACT

A lubricating oil supply device that supplies hydraulic oil used to actuate a vehicle's transmission. The supply device configured with a pump that generates a hydraulic pressure, and a line pressure generation valve that discharges a part of the hydraulic pressure from the pump as a discharge pressure to generate a line pressure for actuating the transmission. A signal pressure output valve that outputs a signal pressure for actuating the line pressure generation valve in accordance with at least a throttle operation amount or torque input to the transmission. Furthermore, a switching valve that is actuated by the signal pressure from the signal pressure output valve and that supplies lubricating oil input to an input port to the object to be lubricated from an output port with a flow rate of the lubricating oil changed.

9 Claims, 8 Drawing Sheets

(51) Int. Cl.
 *F16H 57/04* (2010.01)
 *F16H 45/02* (2006.01)
 *F16N 25/00* (2006.01)
 *F16H 61/14* (2006.01)

(52) U.S. Cl.
 CPC . *F16H2045/0215* (2013.01); *F16H 2061/0037* (2013.01); *Y10T 137/8601* (2015.04)

(56) References Cited

U.S. PATENT DOCUMENTS

| | | | | |
|---|---|---|---|---|
| 6,350,108 | B1* | 2/2002 | Haupt | F04B 17/03 123/196 S |
| 8,342,997 | B2 | 1/2013 | Tanaka et al. | |
| 2002/0028725 | A1 | 3/2002 | Totsuka et al. | |
| 2007/0169753 | A1* | 7/2007 | Sato et al. | 123/467 |
| 2010/0186530 | A1* | 7/2010 | Tamai | F16D 48/06 74/473.11 |
| 2011/0073427 | A1* | 3/2011 | Ishikawa et al. | 192/3.3 |

FOREIGN PATENT DOCUMENTS

| | | |
|---|---|---|
| JP | A-9-14427 | 1/1997 |
| JP | A-11-344098 | 12/1999 |
| JP | A-2000-193073 | 7/2000 |
| JP | A-2002-81530 | 3/2002 |
| JP | A-2007-177868 | 7/2007 |
| WO | WO 2011/001841 A1 | 1/2011 |

* cited by examiner

FIG.2

|  |  | C-1 | C-2 | C-3 | B-1 | B-2 | F-1 | SL1 | SL2 | SL3 | SL5 | S1 | S2 |
|---|---|---|---|---|---|---|---|---|---|---|---|---|---|
| P |  |  |  |  |  |  |  |  |  |  |  |  |  |
| REV |  |  |  | ○ |  | ○ |  |  |  |  |  |  |  |
| N |  |  |  |  |  |  |  |  |  |  |  |  |  |
| D | 1st | ○ |  |  |  | (○) | ○ | ○ |  | (○) |  | (○) |  |
| D | 2nd | ○ |  | ○ |  |  |  | ○ |  |  | ○ |  |  |
| D | 3rd | ○ |  | ○ |  |  |  | ○ |  | ○ |  |  |  |
| D | 4th | ○ | ○ |  |  |  |  | ○ | ○ |  |  |  |  |
| D | 5th |  | ○ | ○ |  |  |  |  | ○ | ○ |  |  |  |
| D | 6th |  | ○ |  | ○ |  |  |  | ○ |  | ○ |  |  |

(○): ENGAGED WITH ENGINE BRAKE IN OPERATION

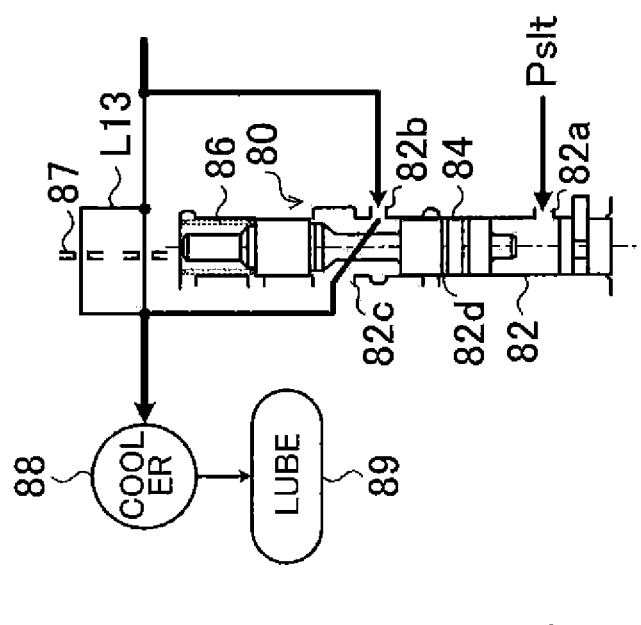
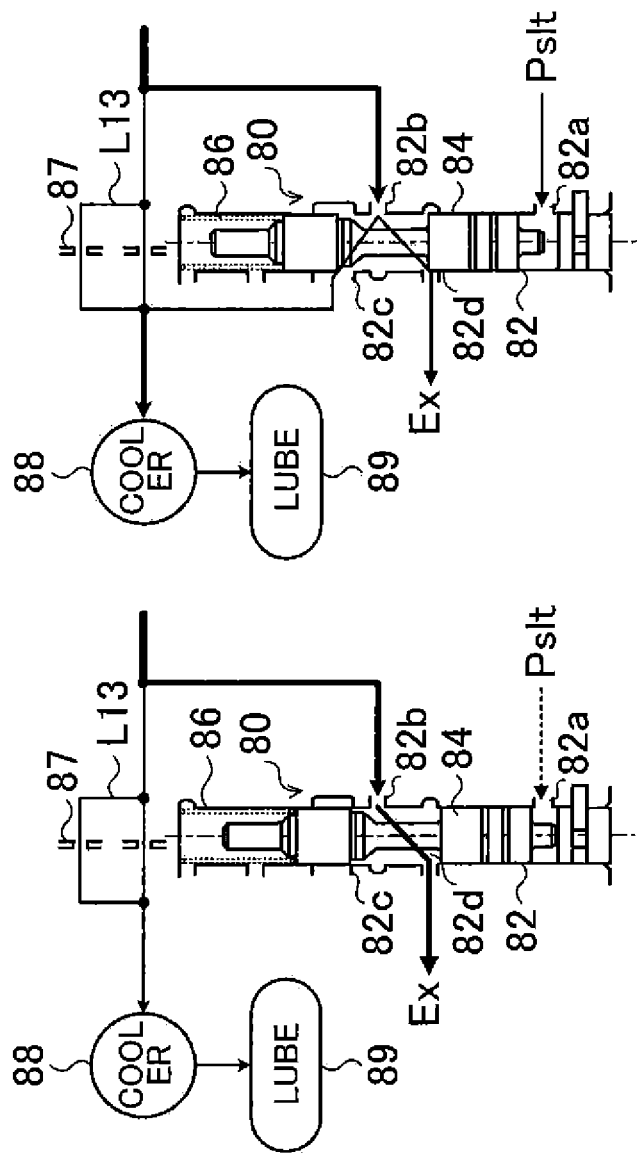

F I G . 6
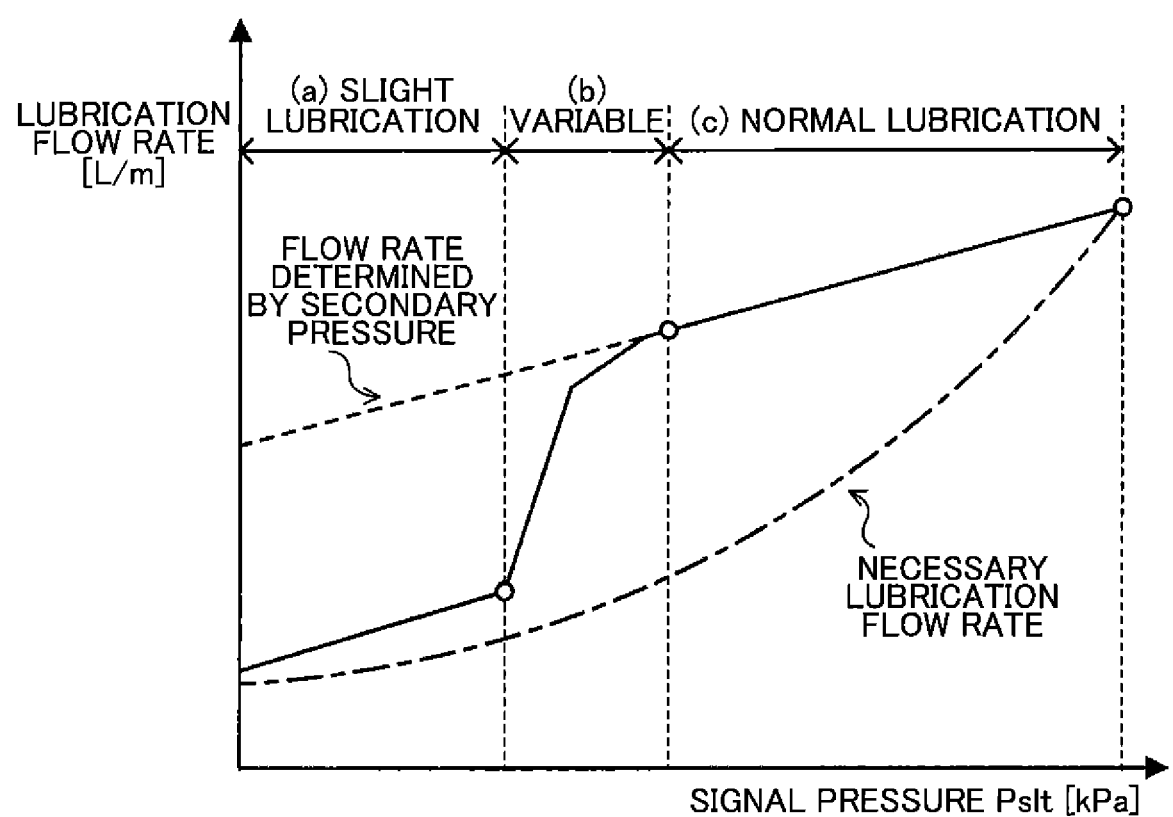

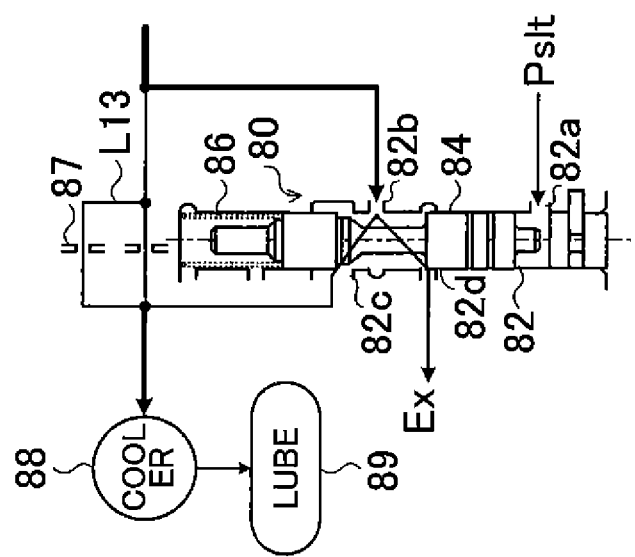
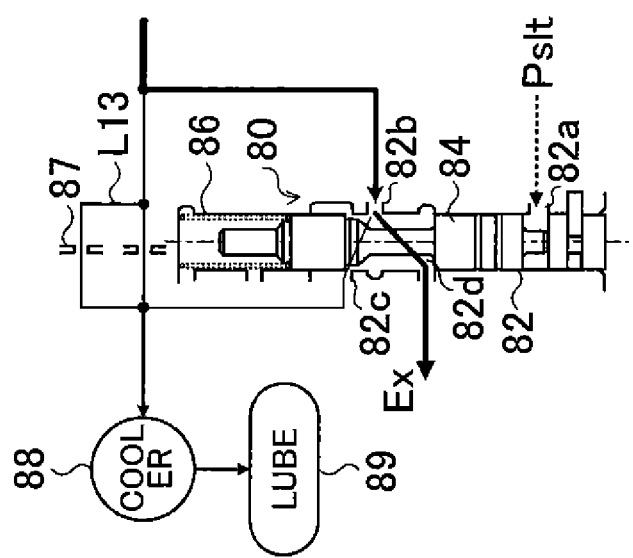

LUBRICATING OIL SUPPLY DEVICE

TECHNICAL FIELD

The present invention relates to a lubricating oil supply device that supplies hydraulic oil used to actuate a transmission mounted on a vehicle to an object to be lubricated of the transmission as lubricating oil.

BACKGROUND ART

Hitherto, there has been proposed a lubricating oil supply device of this type, in which oil leaked from a regulator, which is a part of oil discharged from a hydraulic pump, is supplied to an object to be lubricated of an automatic transmission and an oil cooler (see Patent Document 1, for example). The device includes a lubrication pressure regulator that regulates a pressure (lubrication pressure) to be supplied to the object to be lubricated and that supplies the leaked oil to the oil cooler, and the lubrication pressure regulator is driven by a dedicated electromagnetic valve. Specifically, the electromagnetic valve is controlled such that the amount of oil to be supplied to the object to be lubricated is reduced and the amount of oil to be supplied to the oil cooler is increased in the case where the vehicle speed is equal to or more than a predetermined vehicle speed (high-speed travel) and the engine load is equal to or less than a predetermined value (low load).

RELATED-ART DOCUMENTS

Patent Documents

Patent Document 1: Japanese Patent Application Publication No. 2002-81530 (JP 2002-81530 A)

SUMMARY OF THE INVENTION

In the device discussed above, while it is possible to reduce a loss in the transmission by optimizing the amount of oil to be supplied to the object to be lubricated by the lubrication pressure regulator, use of the dedicated electromagnetic valve to drive the lubrication pressure regulator increases the number of components and increases the size of the device.

It is a main object of the lubricating oil supply device according to the present invention to optimize the flow rate of lubricating oil to be supplied to an object to be lubricated and reduce the size of the device.

In order to achieve the foregoing main object, the lubricating oil supply device according to the present invention adopts the following means.

The present invention provides a lubricating oil supply device that supplies hydraulic oil used to actuate a transmission mounted on a vehicle to an object to be lubricated of the transmission as lubricating oil, including:

a pump that generates a hydraulic pressure;

a line pressure generation valve that discharges a part of the hydraulic pressure from the pump as a discharge pressure to generate a line pressure for actuating the transmission;

a signal pressure output valve that outputs a signal pressure for actuating the line pressure generation valve in accordance with at least a throttle operation amount or torque input to the transmission; and a switching valve that is actuated by the signal pressure from the signal pressure output valve and that supplies lubricating oil input to an input port to the object to be lubricated from an output port with a flow rate of the lubricating oil changed.

The lubricating oil supply device according to the present invention includes: the line pressure generation valve which generates the line pressure for actuating the transmission; the signal pressure output valve which outputs the signal pressure which matches at least the throttle operation amount or the torque input to the transmission; and the switching valve which is actuated by the signal pressure from the signal pressure output valve and which supplies the lubricating oil input to the input port to the object to be lubricated from the output port with the flow rate of the lubricating oil changed. That is, the signal pressure output valve which is used to actuate the line pressure generation valve is also used to actuate the switching valve, and thus it is possible to reduce the size of the entire device through common use of the signal pressure output valve. In addition, the switching valve is actuated by the signal pressure output in accordance with at least the throttle operation amount or the torque input to the transmission, and thus the amount of lubricating oil can be optimized by causing the flow rate of lubricating oil to be supplied to the object to be lubricated to match the throttle operation amount or the torque input to the transmission.

In the lubricating oil supply device according to the present invention, the switching valve may change the flow rate of the lubricating oil with a step with respect to variations in the signal pressure. Consequently, it is possible to achieve a design that suits the amount of lubricating oil required for the object to be lubricated better than a design in which the flow rate of lubricating oil is varied linearly with respect to variations in signal pressure. In the lubricating oil supply device according to this aspect of the present invention, the switching valve may switch between a first lubrication mode in which the flow rate of the lubricating oil is low and a second lubrication mode in which the flow rate of the lubricating oil is high across the step.

The lubricating oil supply device according to the present invention may further include: a bypass oil passage that bypasses the switching valve to supply the lubricating oil to the object to be lubricated; and an orifice formed in the bypass oil passage. Consequently, it is possible to stably supply lubricating oil to the object to be lubricated.

The lubricating oil supply device according to the present invention may further include a secondary pressure generation valve that is actuated by the signal pressure from the signal pressure output valve and that discharges a part of a discharge pressure of the line pressure as a discharge pressure to generate a secondary pressure, and the switching valve may be a valve that receives at the input port hydraulic oil pumped by the secondary pressure as the lubricating oil. In the lubricating oil supply device according to an aspect of the present invention which supplies hydraulic oil used to actuate a torque converter to the object to be lubricated as lubricating oil, the hydraulic oil pumped by the secondary pressure may be supplied to the input port of the switching valve via a working chamber of the torque converter. The lubricating oil supply device according to as aspect of the present invention in which the torque converter includes a lock-up clutch may further include a relay valve that switches between a state in which the hydraulic oil pumped by the secondary pressure is supplied to the input port of the switching valve via the working chamber of the torque converter, and a state in which the hydraulic oil pumped by the secondary pressure is supplied to an engagement chamber of the lock-up clutch and hydraulic oil pumped by the discharge pressure of the secondary pressure is supplied to the input port of the switching valve.

BRIEF DESCRIPTION OF THE DRAWINGS

FIG. 2 is an operation table of a speed change mechanism 40.

FIG. 5 illustrates the state of a LUBE relay valve 80 in each of a slight lubrication mode, a variable mode, and a normal lubrication mode.

FIG. 6 illustrates the relationship between the signal pressure Pslt from the linear solenoid valve SLT and the flow rate (lubrication flow rate) of lubricating oil to be supplied to an object to be lubricated 89.

FIG. 8 illustrates the state of the LUBE relay valve 80 in each of the slight lubrication mode, the variable mode, and the normal lubrication mode according to the modification.

MODES FOR CARRYING OUT THE INVENTION

A preferred embodiment of the present invention will be described below.

Figure 1:
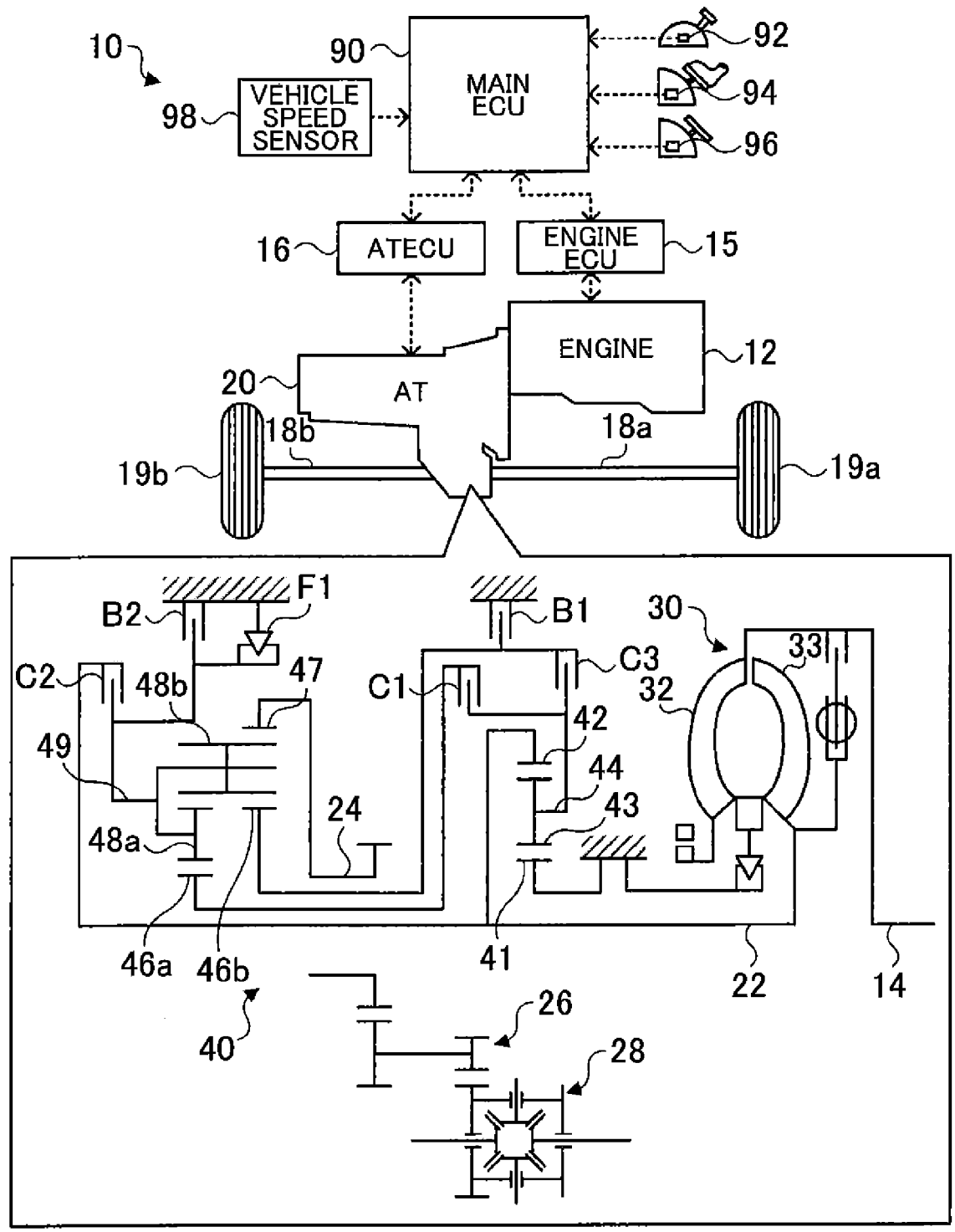
FIG. 1 is a diagram illustrating a schematic configuration of an automobile 10.

FIG. 1 is a diagram illustrating a schematic configuration of an automobile 10. FIG. 2 is an operation table of a speed change mechanism 40.

As illustrated in FIG. 1, the automobile 10 includes: an engine 12 which is an internal combustion engine that outputs power generated by explosive combustion of a hydrocarbon fuel such as gasoline and light oil; an engine electronic control unit (engine ECU) 15 that controls operation of the engine 12; an automatic transmission 20 connected to a crankshaft 14 of the engine 12 and to axles 18a and 18b for left and right wheels 19a and 19b, respectively, to transfer power from the engine 12 to the axles 18a and 18b; an automatic transmission electronic control unit (AT ECU) 16 that controls the automatic transmission 20; and a main electronic control unit (main ECU) 90 that controls the entire vehicle. A shift position SP from a shift position sensor 92 that detects the operating position of a shift lever, an accelerator operation amount Acc from an accelerator pedal position sensor 94 that detects the depression amount of an accelerator pedal, a brake switch signal BSW from a brake switch 96 that detects depression of a brake pedal, a vehicle speed V from a vehicle speed sensor 98, and so forth are input to the main ECU 90 via an input port. The main ECU 90 communicates with the engine ECU 15 and the AT ECU 16 via a communication port to exchange various control signals and data with the engine ECU 15 and the AT ECU 16.

As illustrated in FIG. 1, the automatic transmission 20 includes: a torque converter 30 with a lock-up clutch composed of a pump impeller 32 on the input side connected to the crankshaft 14 of the engine 12 and a turbine runner 33 on the output side; the stepped speed change mechanism 40 which has an input shaft 22 connected to the turbine runner 33 of the torque converter 30 and an output shaft 24 connected to the axles 18a and 18b via a gear mechanism 26 and a differential gear 28 and which outputs to the output shaft 24 power input to the input shaft 22 with the speed of the power changed; and a hydraulic control device 50 (see FIG. 3) that controls the torque converter 30 and the speed change mechanism 40 and that also functions as the lubricating oil supply device according to the present invention which supplies lubricating oil to the speed change mechanism 40 and the gear mechanism 26.

The speed change mechanism 40 is structured as a 6-speed stepped speed change mechanism, and includes a single-pinion type planetary gear mechanism, a Ravigneaux type planetary gear mechanism, three clutches C1, C2, and C3, two brakes B1 and B2, and a one-way clutch F1. The single-pinion type planetary gear mechanism includes a sun gear 41 which is an externally toothed gear, a ring gear 42 which is an internally toothed gear disposed concentrically with the sun gear 41, a plurality of pinion gears 43 meshed with the sun gear 41 and meshed with the ring gear 42, and a carrier 44 that rotatably and revolvably holds the plurality of pinion gears 43. The sun gear 41 is held stationary with respect to a case. The ring gear 42 is connected to the input shaft 22. The Ravigneaux type planetary gear mechanism includes two sun gears 46a and 46b which are each an externally toothed gear, a ring gear 47 which is an internally toothed gear, a plurality of short pinion gears 48a meshed with the sun gear 46a, a plurality of long pinion gears 48b meshed with the sun gear 46b and the plurality of short pinion gears 48a and meshed with the ring gear 47, and a carrier 49 that couples the plurality of short pinion gears 48a and the plurality of long pinion gears 48b to each other and that rotatably and revolvably holds the gears 48a and the gears 48b. The sun gear 46a is connected to the carrier 44 of the single-pinion type planetary gear mechanism via the clutch C1. The sun gear 46b is connected to the carrier 44 via the clutch C3, and connected to the case via the brake B1. The ring gear 47 is connected to the output shaft 24. The carrier 49 is connected to the input shaft 22 via the clutch C2. The carrier 49 is also connected to the case via the one-way clutch F1, and connected to the case via the brake B2 which is provided in parallel with the one-way clutch F1.

As illustrated in FIG. 2, the speed change mechanism 40 can switchably establish first to sixth forward speeds, a reverse speed, and a neutral state by turning on and off the clutches C1 to C3 and turning on and off the brakes B1 and B2 in combination. The reverse speed can be established by turning on the clutch C3 and the brake B2 and turning off the clutches C1 and C2 and the brake B1. The first forward speed can be established by turning on the clutch C1 and turning off the clutches C2 and C3 and the brakes B1 and B2. When the engine brake is in operation, the first forward speed can be established with the brake B2 turned on. The second forward speed can be established by turning on the clutch C1 and the brake B1 and turning off the clutches C2 and C3 and the brake B2. The third forward speed can be established by turning on the clutches C1 and C3 and turning off the clutch C2 and the brakes B1 and B2. The fourth forward speed can be established by turning on the clutches C1 and C2 and turning off the clutch C3 and the brakes B1 and B2. The fifth forward speed can be established by turning on the clutches C2 and C3 and turning off the clutch C1 and the brakes B1 and B2. The sixth forward speed can be established by turning on the clutch C2 and the brake B1 and turning off the clutches C1 and C3 and the brake B2. The neutral state can be established by turning off all the clutches C1 to C3 and the brakes B1 and B2.

Figure 3:
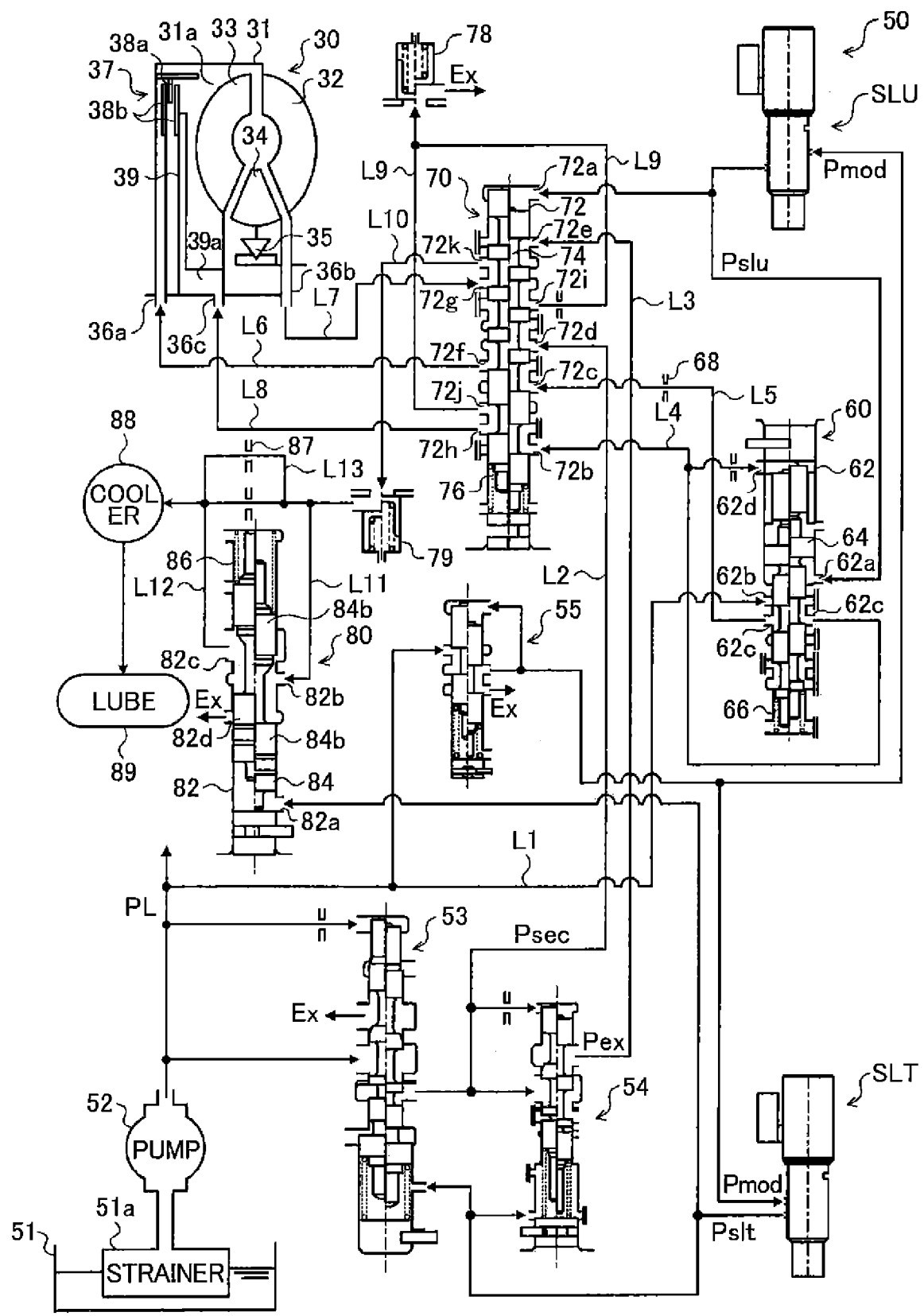
FIG. 3 is a diagram illustrating a schematic configuration of a lubricating oil supply device 50 according to an embodiment of the present invention.

The torque converter 30 is structured as a hydraulic torque converter with a lock-up clutch. As illustrated in FIG. 3, the torque converter 30 includes: the pump impeller 32 connected to the crankshaft 14 of the engine 12 via a converter cover 31; the turbine runner 33 connected to the input shaft 22 of the automatic transmission 20 and disposed to face the pump impeller 32; a stator 34 disposed between the pump impeller 32 and the turbine runner 33 to rectify the flow of hydraulic oil from the turbine runner 33 to the pump impeller 32; a one-way clutch 35 that restricts rotation of the stator 34 to one direction; and a lock-up clutch 37 that mechanically couples the pump impeller 32 (converter cover 31) and the turbine runner 33 to each other. The torque converter 30 transfers torque by converting engine torque into a flow of hydraulic oil through the pump impeller 32, and converting the flow of hydraulic oil into torque on the input shaft 22 of the automatic transmission 20 through the turbine runner 33. In this event, the torque converter 30 functions as a torque amplifier through the action of the stator 34 when the difference between the respective rotational speeds of the pump impeller 32 and the turbine runner 33 is large, and simply functions as a fluid coupling when the difference between the respective rotational speeds of the pump impeller 32 and the turbine runner 33 is small. A converter oil chamber 31a is surrounded by the converter cover 31 and the pump impeller 32 of the torque converter 30. In order to cause hydraulic oil to circulate inside the converter oil chamber 31a, the converter oil chamber 31a is formed with a circulation input port 36a for introduction of hydraulic oil, and a circulation output port 36b for discharge of hydraulic oil.

As illustrated in FIG. 3, the lock-up clutch 37 is structured as a multi-plate clutch capable of establishing and releasing lock-up in which the pump impeller 32 and the turbine runner 33 are coupled to each other, and includes: a clutch plate 38a slidably supported by a clutch hub fixed to the converter cover 31; clutch plates 38b slidably supported by a clutch hub connected to the turbine runner 33; and a clutch piston 39 disposed to be movable within the converter cover 31 so as to press the clutch plates 38a and 38b. A lock-up oil chamber 39a is defined on the back surface side of the clutch piston 39. A pressure difference between the hydraulic pressure of hydraulic oil introduced into the lock-up oil chamber 39a and the hydraulic pressure of hydraulic oil within the converter oil chamber 31a moves the clutch piston 39 to apply a compression pressure to the clutch plates 38a and 38b to establish lock-up in which the pump impeller 32 and the turbine runner 33 are coupled to each other. The lock-up oil chamber 39a is formed with a lock-up port 36c for introduction and discharge of hydraulic oil.

As illustrated in FIG. 3, the hydraulic control device 30 according to the embodiment includes: a mechanical oil pump 52 that suctions hydraulic oil from an oil pan 51 via a strainer 51a using power from the engine 12 to pump the hydraulic oil to a line pressure oil passage L1; a primary regulator valve 53 that regulates the pressure of hydraulic oil in the line pressure oil passage L1 to generate a line pressure PL and that outputs a discharge pressure generated along with the generation of the line pressure PL to a secondary pressure oil passage L2; a secondary regulator valve 54 that regulates the pressure of hydraulic oil in the secondary pressure oil passage L2 to generate a secondary pressure Psec and that outputs a discharge pressure (secondary discharge pressure Pex) generated along with the generation of the secondary pressure Psec to a secondary discharge pressure oil passage L3; a modulator valve 55 that reduces the line pressure PL to generate a modulator pressure Pmod; a linear solenoid valve SLT that regulates the modulator pressure Pmod from the modulator valve 55 to generate a signal pressure Pslt for actuating the primary regulator valve 53 and the secondary regulator valve 54; a lock-up control valve 60 that generates a control pressure Pcl for engaging the lock-up clutch 37 from the line pressure PL in the line pressure oil passage L1 to output the control pressure Pcl; a lock-up relay valve 70 that switches between paths through which hydraulic oil is supplied to and discharged from the torque converter 30; a linear solenoid valve SLU that regulates the modulator pressure Pmod to generate a signal pressure Pslu for driving the lock-up control valve 60 and the lock-up relay valve 70; and a LUBE relay valve 80 actuated by the signal pressure Pslt from the linear solenoid valve SLT to change the flow rate of lubricating oil to be supplied to a cooler (COOLER) 88 and an object to be lubricated (LUBE) 89 such as the clutches C1 to C3, the brakes B1 and B2 (friction members), gears and bearings of the automatic transmission 20. Here, the linear solenoid valve SLT and the linear solenoid valve SLU are controlled by the AT ECU 16. Although not illustrated in detail, the AT ECU 16 is structured as a microprocessor including a CPU as its main component, and includes a ROM that stores a processing program, a RAM that temporarily stores data, input and output ports, a communication port, and so forth in addition to the CPU. The AT ECU 16 communicates with the main ECU 90 to exchange control signals and data with the main ECU 90.

Figure 4:
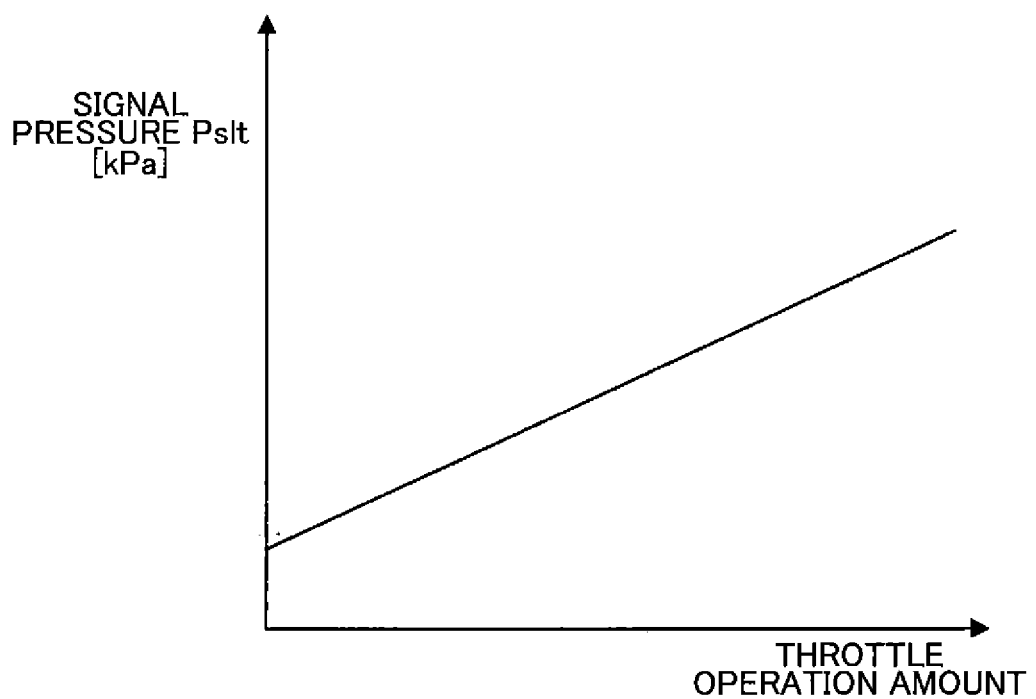
FIG. 4 illustrates the relationship between the throttle operation amount and a signal pressure Pslt from a linear solenoid valve SLT.

Although not illustrated, the line pressure PL is used as an engagement pressure for engaging the clutches C1 to C3 and the brakes B1 and B2, and regulated such that the clutch or brake being engaged has such a torque capacity that enables transfer of input torque from the input shaft 22 of the automatic transmission 20 to the output shaft 24. Specifically, the line pressure PL is regulated by setting the signal pressure Pslt on the basis of the throttle operation amount and the input torque from the input shaft 22, and controlling the linear solenoid valve SLT such that the primary regulator valve 53 is driven by the set signal pressure Pslt. FIG. 4 illustrates an example of the relationship between the throttle operation amount and the signal pressure Pslt. As illustrated in the drawing, the signal pressure Pslt is set so as to become higher as the throttle operation amount becomes larger. The primary regulator valve 53 is structured as a control valve that regulates a hydraulic pressure in accordance with feedback of the output pressure, and has hydraulic characteristics in which the line pressure PL is varied linearly with respect to variations in signal pressure Pslt although not illustrated.

The lock-up control valve 60 is a pressure regulation valve actuated by the signal pressure Pslu from the linear solenoid valve SLU. As illustrated in FIG. 3, the lock-up control valve 60 includes a sleeve 62 formed with various ports, a spool 64 that allows and blocks communication between corresponding ports, and a spring 66 that urges the spool 64 upward in the drawing. The various ports formed in the sleeve 62 include: a signal pressure input port 62a that receives the signal pressure Pslu from the linear solenoid valve SLU; an input port 62b connected to the line pressure oil passage L1 to receive the line pressure PL; an output port 62c that regulates the line pressure PL to output the regulated pressure to control pressure oil passages L4 and L5 as the control pressure Pcl; and a feedback port 62d that receives the pressure output from the output port 62c as a feedback pressure that urges the spool 64 downward in the drawing. The signal pressure input port 62a is formed at a position between two lands formed on the spool 64 with different outside diameters. The signal pressure input to the signal pressure input port 62a acts as a force that urges the spool 64 upward in the drawing because of the difference in area (difference in outside diameter) between respective pressure receiving surfaces of the two lands, namely a land with a larger diameter on the upper side in the drawing and a land with a smaller diameter on the lower side in the drawing. Thus, the spool 64 is urged upward in the drawing by the spring force of the spring 66 and the signal pressure Pslu input to the signal pressure input port 62a, and urged downward in the drawing by the feedback pressure input to the feedback port 62d. In the lock-up control valve 60, the control pressure Pcl is regulated so as to become higher with the area of communication between the input port 62b and the output port 62c increased as the spool 64 is moved upward in the drawing.

An orifice 68 is formed in the control pressure oil passage L5. The control pressure Pcl from the output port 62c of the lock-up control valve 60 is reduced by the orifice 68, and supplied to the lock-up relay valve 70 (input port 72c).

The lock-up relay valve 70 is a switching valve actuated by the signal pressure Pslu from the linear solenoid valve SLU to switch between paths through which a hydraulic pressure is supplied and discharged. As illustrated in FIG. 3, the lock-up relay valve 70 includes a sleeve 72 formed with various ports, a spool 74 that allows and blocks communication between corresponding ports, and a spring 76 that urges the spool 74 upward in the drawing. The various ports formed in the sleeve 72 include: a signal pressure input port 72a that receives the signal pressure Pslu from the linear solenoid valve SLU; an input port 72b connected to the output port 62c of the lock-up control valve 60 via the control pressure oil passage L4 to receive the control pressure Pcl from the output port 62c; the input port 72c connected to the output port 62c of the lock-up control valve 60 via the control pressure oil passage L5 to receive a hydraulic pressure obtained by reducing the control pressure Pcl output from the output port 62c by the orifice 68; an input port 72d connected to the secondary pressure oil passage L2 to receive the secondary pressure Psec; an input port 72e connected to the secondary discharge pressure oil passage L3 to receive the secondary discharge pressure Pex; an output port 72f connected to the circulation input port 36a of the torque converter 30 via a circulation input oil passage L6; an input port 72g connected to the circulation output port 36b of the torque converter 30 via a circulation output oil passage L7; an output port 72h connected to the lock-up port 36c of the torque converter 30 via a lock-up oil passage L8; a relief port 72i connected to a relief oil passage L9 provided with a relief valve 78; a relief port 72j also connected to the relief oil passage L9; and a relief port 72k connected to a relief oil passage L10 provided with a relief valve 79. The cooler (COOLER) 88 is connected posterior to the relief valve 79 via the LUBE relay valve 80. The object to be lubricated 89 is connected posterior to the cooler 88. Hydraulic oil relieved from the relief oil passage L10 by the relief valve 79 is cooled by the cooler 88, and supplied to the object to be lubricated 89.

In the lock-up relay valve 70, as illustrated in FIG. 3, when the signal pressure Pslu is not input from the linear solenoid valve SLU to the signal pressure input port 72a, the spool 74 is moved upward in the drawing by the urging force of the spring 76. Consequently, communication between the input port 72b and the output port 72h is blocked, communication between the input port 72c and the output port 72f is blocked, communication between the input port 72d and the output port 72f is allowed, communication between the input port 72e and the relief port 72k is blocked, communication between the input port 72g and the relief port 72i is blocked, communication between the input port 72g and the relief port 72k is allowed, and communication between the output port 72h and the relief port 72j is allowed. This allows communication between the secondary pressure oil passage L2 to which the input port 72d is connected and the circulation input oil passage L6 to which the output port 72f is connected, communication between the circulation output oil passage L7 to which the input port 72g is connected and the relief oil passage L10 to which the relief port 72k is connected, and communication between the lock-up oil passage L8 to which the output port 72h is connected and the relief oil passage L9 to which the relief port 72j is connected.

When the signal pressure Pslu is input from the linear solenoid valve SLU to the signal pressure input port 72a, on the other hand, the spool 74 is moved downward in the drawing with a pressing force that overcomes the urging force of the spring 76 applied to the spool 74. Consequently, communication between the input port 72b and the output port 72h is allowed, communication between the input port 72c and the output port 72f is allowed, communication between the input port 72d and the output port 72f is blocked, communication between the input port 72e and the relief port 72k is allowed, communication between the input port 72g and the relief port 72i is allowed, communication between the input port 72g and the relief port 72k is blocked, and communication between the output port 72h and the relief port 72j is blocked. This allows communication between the control pressure oil passage L4 to which the input port 72b is connected and the lock-up oil passage L8 to which the output port 72h is connected, communication between the control pressure oil passage L5 to which the input port 72c is connected and the circulation input oil passage L6 to which the output port 72f is connected, communication between the circulation output oil passage L7 to which the input port 72g is connected and the relief oil passage L9 to which the relief port 72i is connected, and communication between the secondary discharge pressure oil passage L3 to which the input port 72e is connected and the relief oil passage L10 to which the relief port 72k is connected.

The LUBE relay valve 80 is structured as a switching valve that changes the amount of lubricating oil to be supplied to the object to be lubricated 89 via the cooler 88. As illustrated in FIG. 3, the LUBE relay valve 80 includes a sleeve 82 formed with various ports, a spool 84 that allows and blocks communication between corresponding ports, and a spring 86 that urges the spool 84 downward in the drawing. The various ports formed in the sleeve 82 include: a signal pressure input port 82a that receives the output pressure (signal pressure Pslt) from the linear solenoid valve SLT as a signal pressure for pressing the spool 84 in the direction opposite to that of the urging force of the spring 86; an input port 82b connected posterior to the relief valve 79 via a lubrication input oil passage L11 to receive hydraulic oil relieved from the relief valve 79 as lubricating oil; an output port 82c connected to the cooler 88 via a lubrication output oil passage L12; and a drain port 82d. The input port 82b is disposed between the output port 82c and the drain port 82d, and communicated with an oil chamber interposed between two lands 84a and 84b of the spool 84 at all times. The LUBE relay valve 80 is configured to output from the output port 82c lubricating oil input to the input port 82b with the flow rate of the lubricating oil adjusted by moving the spool 84 such that the oil chamber interposed between the two lands 84a and 84b is communicated with one or both of the output port 82c and the drain port 82d.

A bypass oil passage L13 that bypasses the LUBE relay valve 80 is connected to the lubrication input oil passage L11 and the lubrication output oil passage L12. An orifice 87 is formed in the bypass oil passage L13. In the embodiment, the bypass oil passage L13 is structured from two oil passages that extend in parallel with each other and that are each formed with an orifice. The number of oil passages of the bypass oil passage L13 is not limited to two, and may be one or three or more.

Now, operation of the hydraulic control device 50 according to the embodiment structured as described above will be described. First, operation to disengage the lock-up clutch 37 will be described. The lock-up clutch 37 is disengaged by turning off the linear solenoid valve SLU to move the spool 74 of the lock-up relay valve 70 upward in FIG. 3. In this state, as discussed earlier, communication between the secondary pressure oil passage L2 and the circulation input oil passage L6 is allowed, and communication between the circulation output oil passage L7 and the relief oil passage L10 is allowed. Thus, the secondary pressure Psec is supplied as a circulation pressure to the converter oil chamber 31a of the torque converter 30 via the circulation input oil passage L6, and fed from the converter oil chamber 31a to the relief valve 79 via the circulation output oil passage L7 and the relief oil passage L10. Then, hydraulic oil relieved by the relief valve 79 is supplied as lubricating oil to the cooler 88 via the LUBE relay valve 80 and the bypass oil passage L13, cooled by the cooler 88, and thereafter supplied to the object to be lubricated 89. That is, when the lock-up clutch 37 is disengaged, the secondary pressure Psec is supplied to the converter oil chamber 31a as the circulation pressure, and hydraulic oil having passed through the converter oil chamber 31a is supplied to the object to be lubricated 89 as the lubricating oil. The lock-up oil passage L8 is communicated with the relief oil passage L9, and thus hydraulic oil within the lock-up oil chamber 39a is fed to the relief valve 78 via the lock-up oil passage L8 and the relief oil passage L9, and drained by the relief valve 78.

Next, operation to engage the lock-up clutch 37 will be described. The lock-up clutch 37 is engaged by turning on the linear solenoid valve SLU to move spool 74 of the lock-up relay valve 70 downward in FIG. 3, and adjusting the signal pressure Pslu output from the linear solenoid valve SLU such that a pressure difference between the hydraulic pressure in the lock-up oil chamber 39a and the hydraulic pressure in the converter oil chamber 31a is at a target hydraulic pressure to control the lock-up control valve 60. In this state, as discussed earlier, communication between the control pressure oil passage L4 and the lock-up oil passage L8 is allowed, communication between the control pressure oil passage L5 and the circulation input oil passage L6 is allowed, and communication between the circulation output oil passage L7 and the relief oil passage L9 is allowed. Thus, the control pressure Pcl output from the output port 62c of the lock-up control valve 60 is supplied as an engagement pressure for engaging the lock-up clutch 37 to the lock-up oil chamber 39a via the control pressure oil passage L4 and the lock-up oil passage L8, a hydraulic pressure output from the output port 62c of the lock-up control valve 60 and reduced by the orifice 68 is supplied as the circulation pressure to the converter oil chamber 31a via the control pressure oil passage L5 and the circulation input oil passage L6, and hydraulic oil having passed through the converter oil chamber 31a is drained via the circulation output oil passage L7, the relief oil passage L9, and the relief valve 78. That is, the control pressure Pcl is applied to the lock-up oil chamber 39a, and a hydraulic pressure obtained by reducing the control pressure Pcl by the orifice 68 is applied to the converter oil chamber 31a. Thus, a pressure difference is caused between the hydraulic pressures in the lock-up oil chamber 39a and the converter oil chamber 31a to engage the lock-up clutch 37. The pressure difference becomes larger as the control pressure Pcl is higher, and becomes smaller as the control pressure Pcl is lower. Thus, the engagement pressure for the lock-up clutch 37 can be controlled by regulating the control pressure Pcl by the lock-up control valve 60. When the lock-up clutch 37 is engaged, communication between the secondary discharge pressure oil passage L3 and the relief oil passage L10 is allowed, and thus hydraulic oil pumped by the secondary discharge pressure Pex is fed to the relief valve 79 via the secondary discharge pressure oil passage L3 and the relief oil passage L10. Then, hydraulic oil relieved by the relief valve 79 is supplied as lubricating oil to the cooler 88 via the LUBE relay valve 80 and the bypass oil passage L13, cooled by the cooler 88, and thereafter supplied to the object to be lubricated 89. That is, when the lock-up clutch 37 is engaged, hydraulic oil pumped by the secondary discharge pressure Pex is supplied to the object to be lubricated 89 as the lubricating oil.

Here, the LUBE relay valve 80 operates to switch among three modes, namely a slight lubrication mode, a variable mode, and a normal lubrication mode, in accordance with the signal pressure Pslt. FIG. 5 illustrates the state of the LUBE relay valve 80 in each of the slight lubrication mode, the variable mode, and the normal lubrication mode. As illustrated in the drawing, in the slight lubrication mode, the input port 82b is communicated with the drain port 82d with the output port 82c completely blocked (see FIG. 5A), and the object to be lubricated 89 is supplied with only lubricating oil from the bypass oil passage L13. In the variable mode, the input port 82b is communicated with both the output port 82c and the drain port 82d (see FIG. 5B), and the object to be lubricated 89 is supplied with lubricating oil from the bypass oil passage L13 and lubricating oil from the LUBE relay valve 80, a part of which has been drained for flow rate adjustment. In the normal lubrication mode, the input port 82b and the output port 82c are communicated with each other with the drain port 82d completely blocked (see FIG. 5C), and the object to be lubricated 89 is supplied with lubricating oil from the bypass oil passage L13 and lubricating oil from the LUBE relay valve 80. FIG. 6 illustrates the relationship between the signal pressure Pslt from the linear solenoid valve SLT and the flow rate (lubrication flow rate) of lubricating oil to be supplied to the object to be lubricated 89. The dash-and-dot line in FIG. 6 indicates the necessary lubrication flow rate that is necessary to secure the durability of the object to be lubricated 89. As illustrated in the drawing, the slight lubrication mode is used when the signal pressure Pslt is low, the variable mode is used when the signal pressure Pslt is moderate, and the normal lubrication mode is used when the signal pressure Pslt is high. In any of the modes, the lubrication flow rate is set to be equal to or more than the necessary lubrication flow rate. In the embodiment, the LUBE relay valve 80 is structured as a switching valve without a feedback port that operates in accordance with the signal pressure Pslt from the linear solenoid valve SLT, and configured to vary the lubrication flow rate steeply with respect to variations in signal pressure Pslt in the variable mode, and to reduce the lubrication flow rate to be close to the necessary lubrication flow rate in the slight lubrication mode. This allows the lubrication flow rate to be reduced to be close to the necessary lubrication flow rate in a region in which the throttle operation amount is small while securing the amount of lubricating oil in a region in which the throttle operation amount is large since the signal pressure Pslt is set so as to become lower as the throttle operation amount becomes smaller as illustrated in FIG. 4. Consequently, it is possible to optimize the lubrication flow rate by suppressing excessive supply of lubricating oil, and to further improve the fuel efficiency by reducing a loss in the automatic transmission 20.

With the lubricating oil supply device according to the embodiment described above, the LUBE relay valve 80 which changes the flow rate of lubricating oil to be supplied to the object to be lubricated 89 is structured as a switching valve that is actuated by the signal pressure Pslt from the linear solenoid valve SLT for driving the primary regulator valve 53 which generates the line pressure PL, and thus it is possible to reduce the number of components and reduce the size of the device. Moreover, the linear solenoid valve SLT outputs the signal pressure Pslt with a magnitude that matches the throttle operation amount, and thus the LUBE relay valve 80 can change the lubrication flow rate in accordance with the throttle operation amount, that is, can reduce the lubrication flow rate to be close to the necessary lubrication flow rate when the throttle operation amount is small. As a result, it is possible to further improve the fuel efficiency by reducing a loss in the automatic transmission 20. In addition, the bypass oil passage L13 which bypasses the LUBE relay valve 80 to supply lubricating oil to the object to be lubricated 89 is provided, and thus it is possible to supply a stable amount of lubricating oil to the object to be lubricated 89 when the LUBE relay valve 80 is closed.

With the lubricating oil supply device according to the embodiment, in addition, the LUBE relay valve 80 is structured as a switching valve that varies the lubrication flow rate steeply with respect to variations in signal pressure Pslt in the variable mode, and thus the lubrication flow rate is significantly increased by slightly increasing the signal pressure Pslt in the variable mode. Meanwhile, the primary regulator valve 53 is structured as a control valve that varies the line pressure PL linearly with respect to variations in signal pressure Pslt, and thus the line pressure PL is linearly increased when the signal pressure Pslt is increased over the entire range. Thus, it is possible to increase the lubrication flow rate by increasing the signal pressure Pslt within the range of the variable mode without excessively increasing the line pressure PL.

In the embodiment, the bypass oil passage L13 which bypasses the LUBE relay valve 80 to supply lubricating oil to the object to be lubricated 89 is provided. However, the bypass oil passage L13 may not be provided.

In the embodiment, lubricating oil output from the LUBE relay valve 80 and the bypass oil passage L13 is supplied to the object to be lubricated 89 via the cooler 88. However, such lubricating oil may be supplied to the object to be lubricated 89 directly not via the cooler 88.

Figure 7:
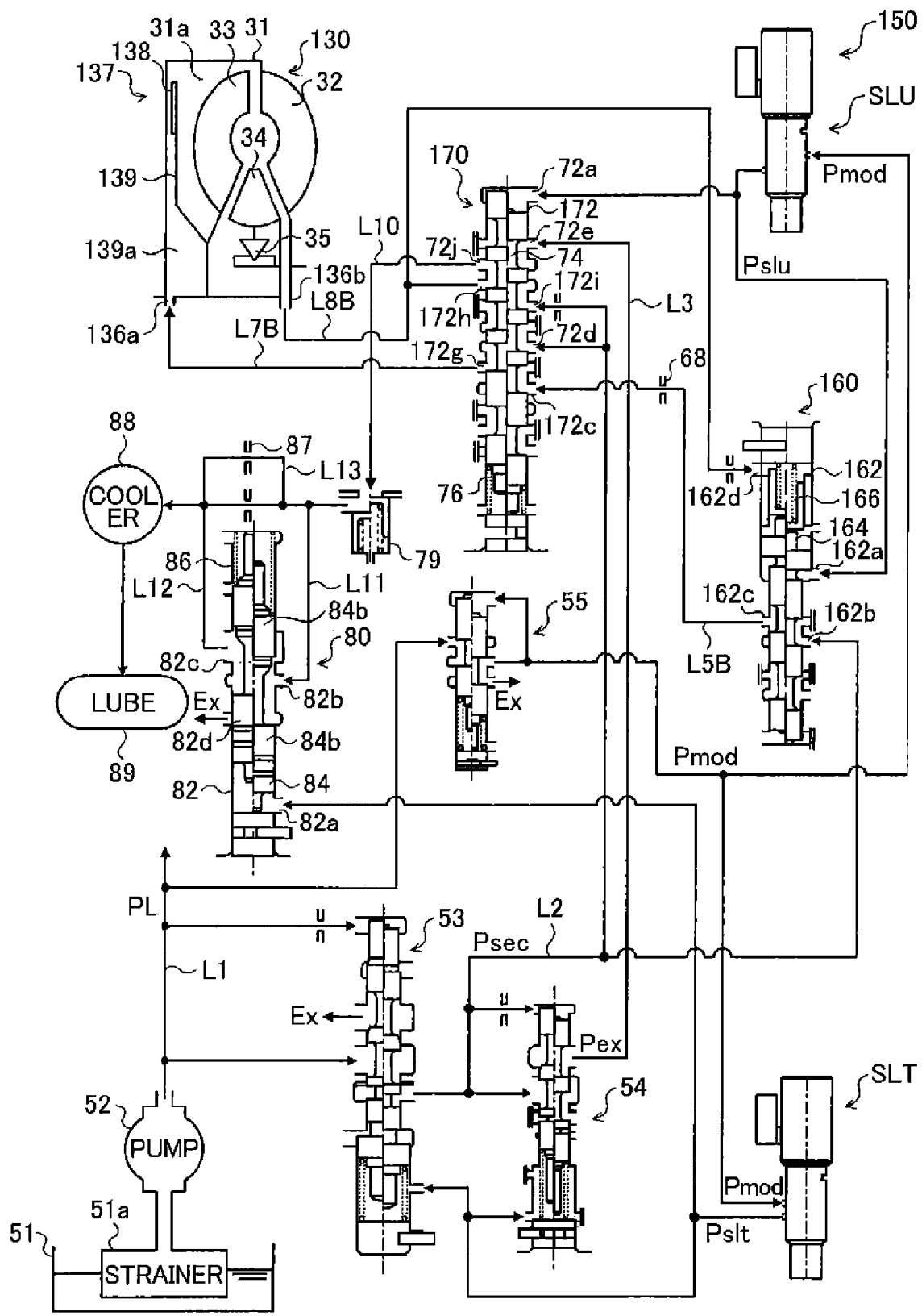
FIG. 7 is a diagram illustrating a schematic configuration of a lubricating oil supply device 150 according to a modification.

In the embodiment, the lock-up clutch 37 is structured as a multi-plate clutch. However, the lock-up clutch 37 may be structured as a single-plate clutch. FIG. 7 illustrates a hydraulic control device 150 according to such a modification. Components of the hydraulic control device 150 according to the modification that are identical to those of the hydraulic control device 50 according to the embodiment are given the same reference numerals to omit redundant descriptions. A torque converter 130 according to the modification includes a lock-up clutch 137 that has a single clutch plate 138 and a clutch piston 139 that turns on lock-up by pressing the clutch plate 138 against the inner wall of the converter cover 31. The torque converter 130 is formed with a lock-up off port 136a connected to a lock-up off oil passage L7B, and a lock-up on port 136b connected to a lock-up on oil passage L8B. A lock-up off chamber 139a is defined between the converter cover 31 and the clutch piston 139. The lock-up off port 136a is communicated with the lock-up off chamber 139a. A sleeve 162 of a lock-up control valve 160 is formed with not only a signal pressure input port 162a to which the signal pressure Pslu is input but also an input port 162b connected to the secondary pressure oil passage L2, an output port 162c connected to a control pressure oil passage L5B, and a feedback port 162d connected to the lock-up on oil passage L8B. A spool 164 of the lock-up control valve 160 is urged upward in the drawing by the signal pressure Pslu input to the signal pressure input port 162a, and urged downward in the drawing by the spring force of the spring 166 and a feedback pressure input to the feedback port 162d. The control pressure Pcl is regulated so as to become lower with the area of communication between the input port 162b and the output port 162c reduced as the spool 164 is moved upward in the drawing. A sleeve 172 of a lock-up relay valve 170 is formed with not only the signal pressure input port 72a to which the signal pressure Pslu is input, the input port 72d to which the secondary pressure Psec is input, the input port 72e to which the secondary discharge pressure Pex is input, and the relief port 72j connected to the relief oil passage L10 but also an input port 172c connected to the control pressure oil passage L5B, an input/output port 172g connected to the lock-up off oil passage L7B, an input/output port 172h connected to the lock-up on oil passage L8B, and an input port 172i connected to the secondary pressure oil passage L2. In the lock-up relay valve 170, when the signal pressure Pslu is not input to the signal pressure input port 72a, that is, when lock-up is turned off, communication between the input port 172c and the input/output port 172g is blocked, communication between the input port 72d and the input/output port 172g is allowed, communication between the input port 172i and the input/output port 172h is blocked, communication between the input port 72e and the relief port 72j is blocked, and communication between the input/output port 172h and the relief port 72j is allowed. This allows communication between the secondary pressure oil passage L2 and the lock-up off oil passage L7B and communication between the lock-up on oil passage L8B and the relief oil passage L10. Thus, the secondary pressure Psec is introduced as a circulation pressure to the converter oil chamber 31a via the lock-up off oil passage L7B, and fed from the converter oil chamber 31a to the relief valve 79 via the lock-up on oil passage L8B and the relief oil passage L10. Then, hydraulic oil relieved by the relief valve 79 is supplied as lubricating oil to the cooler 88 via the LUBE relay valve 80 and the bypass oil passage L13, cooled by the cooler 88, and thereafter supplied to the object to be lubricated 89. On the other hand, when the signal pressure Pslu is input to the signal pressure input port 72a, that is, when lock-up is turned on, communication between the input port 172c and the input/output port 172g is allowed, communication between the input port 72d and the input/output port 172g is blocked, communication between the input port 172i and the input/output port 172h is allowed, communication between the input port 72e and the relief port 72j is allowed, and communication between the input/output port 172h and the relief port 72j is blocked. This allows communication between the secondary pressure oil passage L2 and the lock-up on oil passage L8B and communication between the control pressure oil passage L5B and the lock-up off oil passage L7B. Thus, the secondary pressure Psec is applied to the converter oil chamber 31a, and a hydraulic pressure obtained by reducing the control pressure Pcl by the orifice 68 is applied to the lock-up off chamber 139a. The control pressure Pcl becomes lower as the signal pressure Pslu to be applied to the signal pressure input port 162a of the lock-up control valve 160 becomes higher. Thus, a pressure difference can be caused between the hydraulic pressures in the converter oil chamber 31a and the lock-up off chamber 139a by controlling the linear solenoid valve SLU to engage the lock-up clutch 137. In addition, communication between the secondary discharge pressure oil passage L3 and the relief oil passage L10 is allowed, and thus hydraulic oil pumped by the secondary discharge pressure Pex is supplied as lubricating oil to the cooler 88 via the secondary discharge pressure oil passage L3, the relief oil passage L10, the relief valve 79, the LUBE relay valve 80, and the bypass oil passage L13, cooled by the cooler 88, and thereafter supplied to the object to be lubricated 89.

In the embodiment, in the slight lubrication mode, the object to be lubricated 89 is not supplied with lubricating oil from the LUBE relay valve 80 with the output port 82c completely blocked (but supplied with only lubricating oil from the bypass oil passage L13). However, the present invention is not limited thereto, and the object to be lubricated 89 may be supplied with a small amount of lubricating oil from the LUBE relay valve 80 even in the slight lubrication mode. FIG. 8 illustrates the state of the LUBE relay valve 80 in each of the slight lubrication mode, the variable mode, and the normal lubrication mode according to a modification. In the modification, as illustrated in the drawing, in the slight lubrication mode, the input port 82b is slightly communicated with the output port 82c and maximally communicated with the drain port 82d (see FIG. 8A), and the object to be lubricated 89 is supplied with a small amount of lubricating oil from the output port 82c and lubricating oil from the bypass oil passage L13. The variable mode and the normal lubrication mode are the same as those according to the embodiment.

In the embodiment, both the lock-up control valve 60 and the lock-up relay valve 70 are controlled using the signal pressure Pslu from the single linear solenoid valve SLU. However, the present invention is not limited thereto, and the lock-up control valve 60 and the lock-up relay valve 70 may be controlled separately using signal pressures from separate linear solenoids. Alternatively, the lock-up control valve 60 and the lock-up relay valve 70 may be provided with a built-in solenoid, and directly actuated by the built-in solenoid.

In the embodiment, switching between paths through which a hydraulic pressure is supplied to and discharged from the circulation input oil passage L6, the circulation output oil passage L7, and the lock-up oil passage L8 for the torque converter 30 is performed using the single lock-up relay valve 70. However, such switching may be performed using a plurality of relay valves.

Here, the correspondence between the main elements of the embodiment and the main elements of the invention described in the "SUMMARY OF THE INVENTION" section will be described. The automatic transmission 20 according to the embodiment corresponds to the "transmission" according to the present invention. The mechanical oil pump 52 corresponds to the "pump". The primary regulator valve 53 corresponds to the "line pressure generation valve". The linear solenoid valve SLT corresponds to the "signal pressure output valve". The LUBE relay valve 80 corresponds to the "switching valve". The bypass oil passage L13 corresponds to the "bypass oil passage". The orifice 87 corresponds to the "orifice". The secondary regulator valve 54 corresponds to the "secondary pressure generation valve". The torque converter 30 corresponds to the "torque converter". The lock-up clutch 37 corresponds to the "lock-up clutch". The lock-up relay valve 70 corresponds to the "relay valve". The slight lubrication mode corresponds to the "first lubrication mode". The normal lubrication mode corresponds to the "second lubrication mode". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented in various forms without departing from the scope and sprit of the present invention.

INDUSTRIAL APPLICABILITY

The present invention can be utilized in the industry for the manufacture of hydraulic control devices.

The invention claimed is:

1. A lubricating oil supply device that supplies hydraulic oil used to actuate a transmission mounted on a vehicle to an object to be lubricated of the transmission as lubricating oil, comprising:
   a pump that generates a hydraulic pressure;
   a line pressure generation valve that discharges a part of the hydraulic pressure from the pump as a discharge pressure to generate a line pressure for actuating the transmission;
   a signal pressure output valve that outputs a signal pressure for actuating the line pressure generation valve in accordance with at least a throttle operation amount or torque input to the transmission; and
   a switching valve that is actuated by the signal pressure from the signal pressure output valve and that supplies lubricating oil input to an input port to the object to be lubricated from an output port with a flow rate of the lubricating oil changed,
   wherein the switching valve switches between a first lubrication mode in which the flow rate of the lubricating oil is low and the flow rate changes linearly and a second lubrication mode in which the flow rate of the lubricating oil is high and the flow rate changes linearly via a step where a rate of change of the flow rate of the lubricating oil is more than in the first lubrication mode and the second lubrication mode.

2. The lubricating oil supply device according to claim 1, wherein
   the switching valve changes the flow rate of the lubricating oil with the step with respect to variations in the signal pressure.

3. The lubricating oil supply device according to claim 1, further comprising:
   a bypass oil passage that bypasses the switching valve to supply the lubricating oil to the object to be lubricated; and
   an orifice formed in the bypass oil passage.

4. The lubricating oil supply device according to claim 1, further comprising:
   a secondary pressure generation valve that is actuated by the signal pressure from the signal pressure output valve and that discharges a part of a discharge pressure of the line pressure as a discharge pressure to generate a secondary pressure, wherein
   the switching valve is a valve that receives at the input port hydraulic oil pumped by the secondary pressure as the lubricating oil.

5. The lubricating oil supply device according to claim 4 which supplies hydraulic oil used to actuate a torque converter to the object to be lubricated as lubricating oil, wherein
the hydraulic oil pumped by the secondary pressure is supplied to the input port of the switching valve via a working chamber of the torque converter.

6. The lubricating oil supply device according to claim 5 in which the torque converter includes a lock-up clutch, further comprising:
a relay valve that switches between a state in which the hydraulic oil pumped by the secondary pressure is supplied to the input port of the switching valve via the working chamber of the torque converter, and a state in which the hydraulic oil pumped by the secondary pressure is supplied to an engagement chamber of the lock-up clutch and hydraulic oil pumped by the discharge pressure of the secondary pressure is supplied to the input port of the switching valve.

7. The lubricating oil supply device according to claim 3, wherein
the switching valve switches between a first mode in which the output port is blocked and the input port communicates with a drain port and a second mode in which the drain port is blocked and the input port communicates with the output port.

8. The lubricating oil supply device according to claim 1, further comprising:
a secondary pressure generation valve for pressure regulating the discharge pressure of the line pressure generation valve, wherein
the switching valve is disposed on a downstream side of the secondary pressure generation valve,
the secondary pressure generation valve generates a secondary pressure to actuate a torque convertor, and
an output port of the secondary pressure generation valve and the input port of the switching valve communicate with each other.

9. The lubricating oil supply device according to claim 1, further comprising:
a relay valve for switching an oil passage of hydraulic oil that is supplied to and discharged from a torque converter, wherein
the switching valve is disposed on a downstream side of the relay valve.

* * * * *